US012608834B2

(12) United States Patent
Kim et al.

(10) Patent No.: US 12,608,834 B2
(45) Date of Patent: Apr. 21, 2026

(54) METHODS AND APPARATUSES FOR AMOUNT OF OBJECT USING TWO DIMENSIONAL IMAGE

(71) Applicant: NUVI LABS CO., LTD., Incheon (KR)

(72) Inventors: Dae Hoon Kim, Seoul (KR); Jey Yoon Ru, Seoul (KR); Seung Woo Ji, Seoul (KR)

(73) Assignee: NUVI LABS CO., LTD., Incheon (KR)

( * ) Notice: Subject to any disclaimer, the term of this patent is extended or adjusted under 35 U.S.C. 154(b) by 488 days.

(21) Appl. No.: 18/090,404

(22) Filed: Dec. 28, 2022

(65) Prior Publication Data

US 2024/0153124 A1     May 9, 2024

(30) Foreign Application Priority Data

Nov. 9, 2022    (KR) ........................ 10-2022-0148835

(51) Int. Cl.
| | |
|---|---|
| *G06T 7/62* | (2017.01) |
| *G06T 7/00* | (2017.01) |
| *G06T 7/11* | (2017.01) |
| *G06T 7/194* | (2017.01) |
| *G06T 7/50* | (2017.01) |

(Continued)

(52) U.S. Cl.
CPC .................. *G06T 7/62* (2017.01); *G06T 7/11* (2017.01); *G06T 7/194* (2017.01); *G06T 7/50* (2017.01); *G06T 7/90* (2017.01); *G06T 7/97* (2017.01); *G06V 10/764* (2022.01); *G06V 10/766* (2022.01); *G06V 10/7715* (2022.01); *G06V 10/776* (2022.01); *G06V 10/806*

(2022.01); *G06T 2207/20081* (2013.01); *G06T 2207/20212* (2013.01); *G06V 20/68* (2022.01)

(58) Field of Classification Search
CPC ... G06T 7/62; G06T 7/11; G06T 7/194; G06T 7/50; G06T 7/90; G06T 7/97; G06T 2207/20081; G06T 2207/20212; G06T 2207/20084; G06T 2207/30128; G06V 10/764; G06V 10/766; G06V 10/7715; G06V 10/776; G06V 10/806; G06V 20/68; G06V 10/761; G01B 11/28
See application file for complete search history.

(56) References Cited

U.S. PATENT DOCUMENTS

| | | | | |
|---|---|---|---|---|
| 2013/0294681 A1* | 11/2013 | Nishimura | ........... | H04N 13/128 |
| | | | | 382/154 |
| 2019/0213416 A1* | 7/2019 | Cho | ........................ | G06V 20/20 |

(Continued)

FOREIGN PATENT DOCUMENTS

| | | | | |
|---|---|---|---|---|
| KR | 102544742 B1 * | 6/2023 | ............... | G06T 5/20 |

*Primary Examiner* — Vu Le
*Assistant Examiner* — Rachel Anne Ometz
(74) *Attorney, Agent, or Firm* — Maschoff Brennan

(57) ABSTRACT

Provided are a method and an apparatus for measuring an object quantity using a 2D image. A method for measuring an object quantity using a 2D image according to one embodiment of the present disclosure comprises learning an object region model in a first object image which is a pre-learning target, learning an object quantity model for a first object region in the first object image using a feature map extracted from the first object image, and measuring an object quantity of at least one of a second object region and a background region in a second object image which is a measurement target using the learned object region model and object quantity model.

12 Claims, 5 Drawing Sheets

(51) Int. Cl.

| | | |
|---|---|---|
| *G06T 7/90* | (2017.01) | |
| *G06V 10/764* | (2022.01) | |
| *G06V 10/766* | (2022.01) | |
| *G06V 10/77* | (2022.01) | |
| *G06V 10/776* | (2022.01) | |
| *G06V 10/80* | (2022.01) | |
| *G06V 20/68* | (2022.01) | |

(56) References Cited

U.S. PATENT DOCUMENTS

| | | | |
|---|---|---|---|
| 2022/0270238 A1* | 8/2022 | Mc Donnell | G06V 20/52 |
| 2022/0319665 A1* | 10/2022 | Wang | G16H 40/63 |
| 2023/0222821 A1* | 7/2023 | Delp, III | G06V 10/44 |
| | | | 382/110 |
| 2024/0104882 A1* | 3/2024 | Jeong | G06V 10/255 |

* cited by examiner

FIG. 1

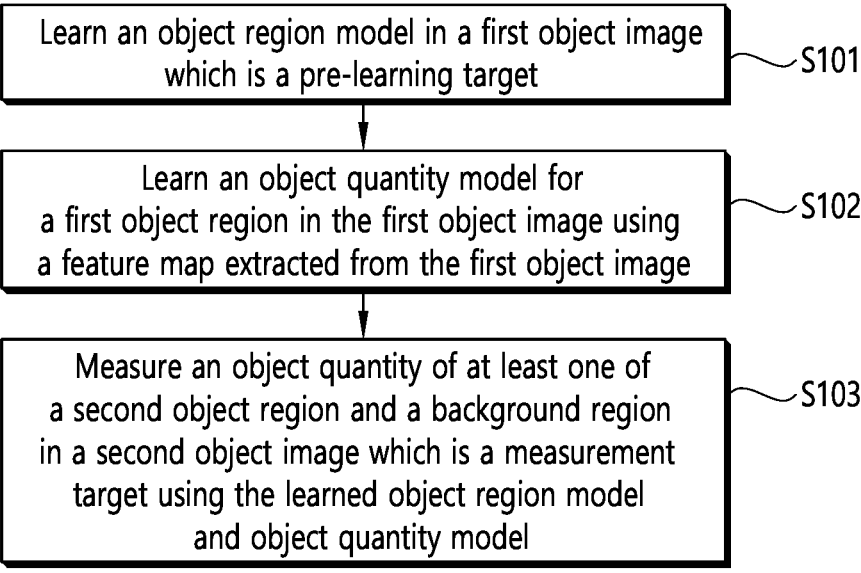

Learn an object region model in a first object image which is a pre-learning target ⌐ S101

Learn an object quantity model for a first object region in the first object image using a feature map extracted from the first object image ⌐ S102

Measure an object quantity of at least one of a second object region and a background region in a second object image which is a measurement target using the learned object region model and object quantity model ⌐ S103

FIG. 2

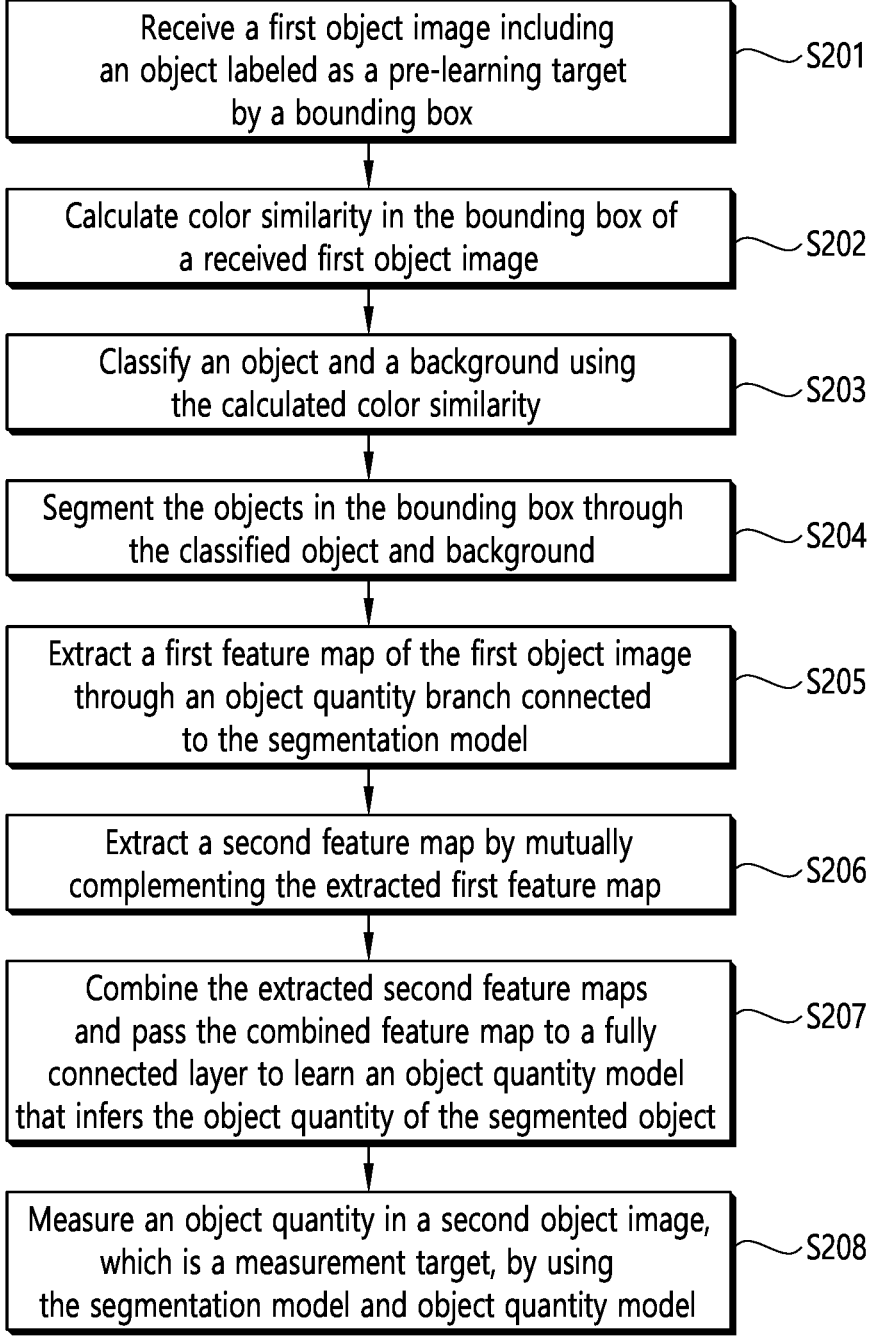

Receive a first object image including
an object labeled as a pre-learning target
by a bounding box — S201

Calculate color similarity in the bounding box of
a received first object image — S202

Classify an object and a background using
the calculated color similarity — S203

Segment the objects in the bounding box through
the classified object and background — S204

Extract a first feature map of the first object image
through an object quantity branch connected
to the segmentation model — S205

Extract a second feature map by mutually
complementing the extracted first feature map — S206

Combine the extracted second feature maps
and pass the combined feature map to a fully
connected layer to learn an object quantity model
that infers the object quantity of the segmented object — S207

Measure an object quantity in a second object image,
which is a measurement target, by using
the segmentation model and object quantity model — S208

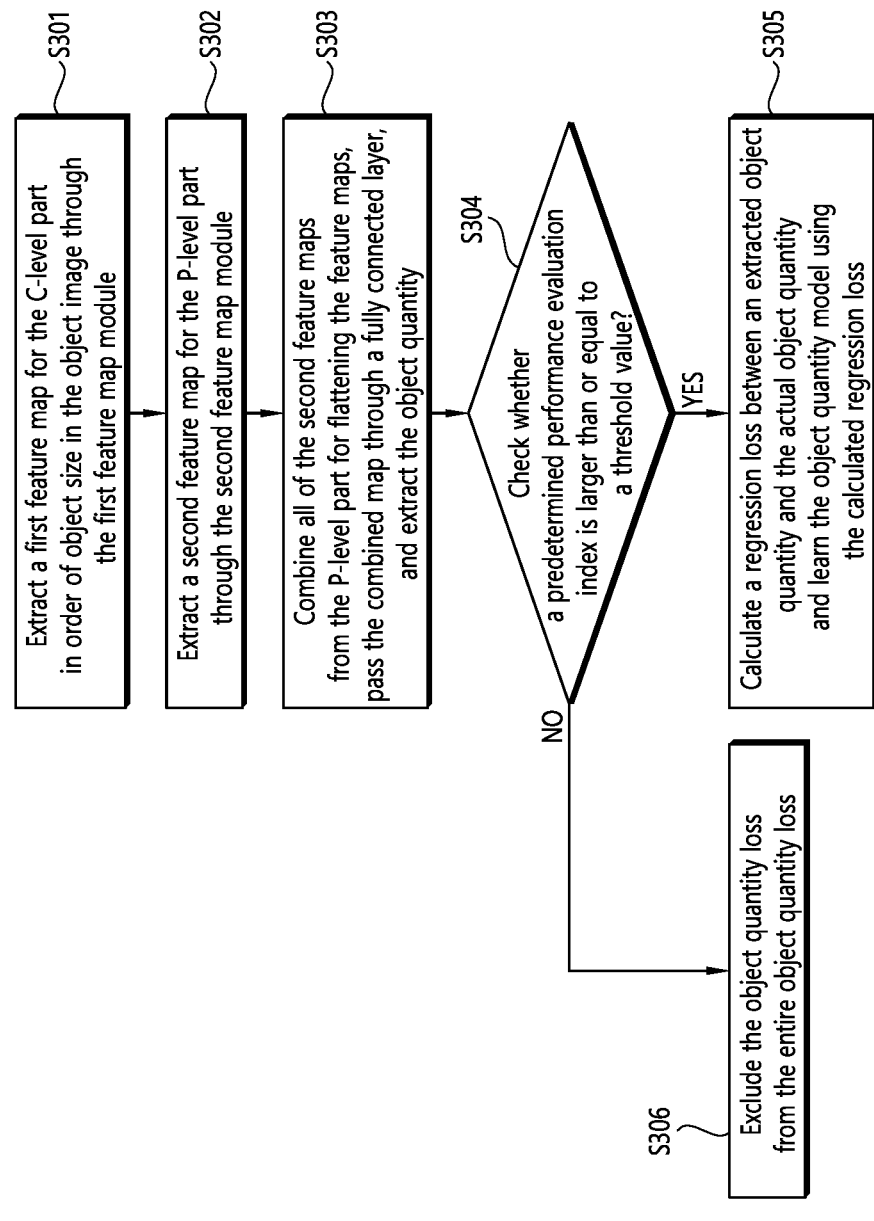

S301 Extract a first feature map for the C-level part in order of object size in the object image through the first feature map module S302 Extract a second feature map for the P-level part through the second feature map module S303 Combine all of the second feature maps from the P-level part for flattening the feature maps, pass the combined map through a fully connected layer, and extract the object quantity S304 Check whether a predetermined performance evaluation index is larger than or equal to a threshold value?

YES

S305 Calculate a regression loss between an extracted object quantity and the actual object quantity and learn the object quantity model using the calculated regression loss

NO

S306 Exclude the object quantity loss from the entire object quantity loss

METHODS AND APPARATUSES FOR AMOUNT OF OBJECT USING TWO DIMENSIONAL IMAGE

CROSS-REFERENCE TO RELATED APPLICATIONS

This application claims benefit of priority to Korean Patent Application No. 10-2022-0148835 filed on 9 Nov. 2022 in the Korean Intellectual Property Office, the disclosure of which is incorporated herein by reference in its entirety.

TECHNICAL FIELD

The present disclosure relates to a method and apparatus for measuring an object quantity using a two-dimensional (2D) image.

BACKGROUND ART

Recently, as more and more people want to maintain a healthy diet, such as a well-being diet, the demand for technology for identifying food and measuring the amount of food is increasing.

When the technology is used properly, even in places where meals are served to a plurality of people, such as schools, companies, military camps, government offices, and hospitals, types and amounts of food served to people may be measured, through which the amount of served and leftover food is measured. Accordingly, many advantageous effects may be obtained in that the amount of demand and supply may be predicted to realize the efficient management of food distribution, and the number of calories consumed by people may be managed.

However, since most current technologies use a food image taken through a camera for a simple image search, the search accuracy is considerably low. Moreover, since the accuracy of food type identification in the image search is low, a resulting error increases in the following steps, such as calorie counting.

Also, to increase the accuracy of food quantity measurement, three-dimensional (3D) images taken through a 3D scanner or the like are used. This technology measures the amount of food using 3D images captured through a 3D scanner or the like. However, most users generally photograph food using their mobile phone, recognize the type of food, and measure the amount of food through the photographed 2D images. Typical mobile phones are not equipped with a 3D scanner for taking 3D images. Therefore, compared to the case where a 3D scanner is employed, accuracy decreases significantly when the volume or amount of food is measured without the 3D scanner.

SUMMARY

Embodiments of the present disclosure are intended to provide a method and apparatus for measuring object quantities using a 2D image, for accurately measuring an object quantity or an object volume using a 2D image.

However, the technical problem to be solved by the present disclosure is not limited to the above but may be extended to other various problems belonging to the scope not departing from the technical principles and domain of the present disclosure.

According to one embodiment of the present disclosure, a method for measuring an object quantity executed by an apparatus for measuring an object quantity may provide a method for measuring an object quantity using a 2D image comprising learning an object region model in a first object image which is a pre-learning target; learning an object quantity model for a first object region in the first object image using a feature map extracted from the first object image; and measuring an object quantity of at least one of a second object region and a background region in a second object image which is a measurement target using the learned object region model and object quantity model.

The learning an object region model may learn an object region model through classification of an object and a background in the first object image.

The learning an object region model may include receiving a first object image including an object for which a pre-learning target region is labeled; and learning an object region model by segmenting an object of a first object region through classification of an object and a background in the first object region of the first object image received.

The learning an object region model may classify an object and a background using color similarity in a first object region of the first object image.

The learning an object quantity model may learn an object quantity model for the first object region by extracting a first feature map for the first object image through an object quantity branch connected to the object region model, extracting a second feature map by mutually complementing the extracted first feature map, combining the extracted second feature maps, and passing the combined feature map to a fully connected layer.

The learning an object quantity model may learn an object quantity model for the first object region by calculating a regression loss between an object quantity inferred through an object quantity branch connected to the object region model and a predetermined, actual object quantity.

The learning an object quantity model may exclude the regression loss between the inferred object quantity and the predetermined, actual object quantity from the operation of learning an object quantity model when a predetermined performance evaluation index is less than a threshold value.

The method may further include extracting a second object included in the second object image and a reference object; estimating a distance between the extracted second object and the reference object through a depth estimation model; correcting the size of the second object in the second object image using the estimated distance between the second object and the reference object; and measuring an object quantity using the corrected size of the second object.

The extracting a reference object may extract reference objects one after another starting from a reference object with the highest priority in the second object image according to a predetermined priority condition.

Meanwhile, according to another embodiment of the present disclosure, an apparatus for measuring an object quantity using a 2D image may be provided, the apparatus comprising a database storing a first object image which is a pre-learning target; a memory storing one or more programs; and a processor executing the stored one or more programs, wherein the processor is configured to learn an object region model in a first object image which is a pre-learning target; learn an object quantity model for a first object region in the first object image using a feature map extracted from the first object image; and measure an object quantity of at least one of a second object region and a background region in a second object image which is a measurement target using the learned object region model and object quantity model.

The processor may learn an object region model through classification of an object and a background in the first object image.

The processor may receive a first object image including an object for which a pre-learning target region is labeled; and learn an object region model by segmenting an object of a first object region through classification of an object and a background in the first object region of the first object image received.

The processor may classify an object and a background using color similarity in a first object region of the first object image.

The processor may learn an object quantity model for the first object region by extracting a first feature map for the first object image through an object quantity branch connected to the object region model, extracting a second feature map by mutually complementing the extracted first feature map, combining the extracted second feature maps, and passing the combined feature map to a fully connected layer.

The processor may learn an object quantity model for the first object region by calculating a regression loss between an object quantity inferred through an object quantity branch connected to the object region model and a predetermined, actual object quantity.

The processor may exclude the regression loss between the inferred object quantity and the predetermined, actual object quantity from the operation of learning an object quantity model when a predetermined performance evaluation index is less than a threshold value.

The processor may extract a second object included in the second object image and a reference object; estimate a distance between the extracted second object and the reference object through a depth estimation model; correct the size of the second object in the second object image using the estimated distance between the second object and the reference object; and measure an object quantity using the corrected size of the second object.

The processor may extract reference objects one after another starting from a reference object with the highest priority in the second object image according to a predetermined priority condition.

The present disclosure may provide the following effects. However, since it is not meant that a specific embodiment has to provide all of or only the following effects, the technical scope of the present disclosure should not be regarded as being limited by the specific embodiment.

Embodiments of the present disclosure may accurately measure an object quantity using a 2D image.

Embodiments of the present disclosure may measure an object quantity without employing a depth camera or a 3D scanner, thereby providing a considerable advantage for a mobile environment where it is difficult to obtain a depth map.

Embodiments of the present disclosure may accurately measure an object quantity or object volume while obviating a depth camera or a 3D scanner, thereby providing a considerable advantage in terms of the cost involved in measuring the object quantity or object volume.

Embodiments of the present disclosure may learn segmentation through the classification of an object and a background in a 2D image and learn the object quantity or volume of a segmented object to measure the object quantity in a 2D object image accurately.

Embodiments of the present disclosure may classify an object and a background using color similarity in an object region of an object image and correctly segment the object in the object region through the classification of the object and the background.

Embodiments of the present disclosure may accurately learn the object quantity or object volume of a segmented object using a regression loss obtained through an object quantity branch connected to an object region model.

Embodiments of the present disclosure may extract an object included in an object image and a reference object and correct the object size by estimating a distance between the object and the reference object, thereby accurately measuring the object quantity or object volume using the corrected size of the object.

BRIEF DESCRIPTION OF THE DRAWINGS

FIG. 1 illustrates a method for measuring an object quantity using a 2D image according to one embodiment of the present disclosure.

FIG. 2 illustrates a method for measuring an object quantity using a 2D image according to another embodiment of the present disclosure.

FIG. 3 illustrates an object quantity measurement model using a 2D image according to one embodiment of the present disclosure.

FIG. 4 illustrates an operation of learning an object quantity model using an object quantity branch module according to one embodiment of the present disclosure.

DESCRIPTION OF EXEMPLARY EMBODIMENTS

Figure 5:
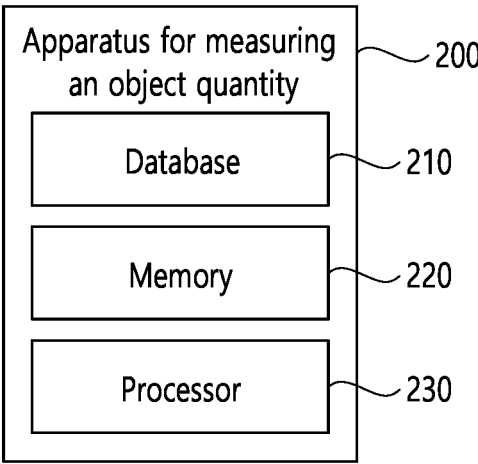
FIG. 5 illustrates a structure of an apparatus for measuring an object quantity using a 2D image according to one embodiment of the present disclosure.

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure; rather, it should be understood that the specific embodiments include all of the modifications, equivalents, or alternatives belonging to the technical principles and scope of the present disclosure. In describing the present disclosure, if it is determined that a detailed description of a related art incorporated herein unnecessarily obscure the gist of the present disclosure, the detailed description thereof will be omitted.

Terms such as "first" and "second" may be used to describe various constituting elements, but the constituting elements should not be limited by the terms. The terms are introduced to distinguish one element from the others.

The technical terms used in the present disclosure have been introduced solely for the purpose of describing a specific embodiment, and it should be noted that the terms are not intended to restrict the technical scope of the present disclosure. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

It should be understood that the singular expression includes the plural expression unless the context clearly indicates otherwise. In the present disclosure, the terms "comprises" or "have" specify the presence of stated features, numerals, steps, operations, components, parts, or a combination thereof, but do not preclude the presence or addition of one or more other features, numerals, steps, operations, components, parts, or a combination thereof.

In the embodiments of the present disclosure, an object represents an entity that exists in the real world and may be recognized from camera capture. For example, objects may include food in a soup kitchen or restaurant, food in a cafeteria or supermarket, general objects, and means of transportation.

In what follows, embodiments of the present disclosure will be described in detail with reference to appended drawings. Throughout the specification, the same or corresponding constituting element is assigned the same reference number, and repeated descriptions thereof will be omitted.

FIG. 1 illustrates a method for measuring an object quantity using a 2D image according to one embodiment of the present disclosure.

As shown in FIG. 1, in the S101 step, an apparatus for measuring an object quantity using a 2D image according to one embodiment of the present disclosure learns an object region model in a first object image which is a pre-learning target. In another example, an apparatus for measuring an object quantity may learn an object region model through classification of an object and a background.

In the S102 step, the apparatus for measuring an object quantity using a 2D image according to one embodiment of the present disclosure learns an object quantity model for a first object region in the first object image using a feature map extracted from the first object image.

In the S103 step, the apparatus for measuring an object quantity using a 2D image according to one embodiment of the present disclosure measures an object quantity of at least one of a second object region and a background region in a second object image which is a measurement target using the learned object region model and object quantity model. Here, when the second object image is taken to measure the corresponding second object quantity, it is necessary to measure not only the second object quantity but also the surrounding background region (e.g., spoon or coin) of the second object (e.g., apple) to infer the second object quantity. The apparatus for measuring an object quantity may measure not only the second object quantity in the second object image but also the object quantity of the surrounding background region of a bounding box, although the entire background region may not be used for the object quantity measurement.

FIG. 2 illustrates a method for measuring an object quantity using a 2D image according to another embodiment of the present disclosure.

As shown in FIG. 2, in the S201 step, an apparatus for measuring an object quantity according to one embodiment of the present disclosure receives a first object image including an object labeled as a pre-learning target by a bounding box.

In the S202 step, the apparatus for measuring an object quantity calculates color similarity in the object region of a received first object image.

In the S203 step, the apparatus for measuring an object quantity classifies the object and the background using the calculated color similarity.

In the S204 step, the apparatus for measuring an object quantity segments the objects in the object region through the classified object and background.

In the S205 step, the apparatus for measuring an object quantity extracts a first feature map of the first object image through an object quantity branch connected to the object region model.

In the S206 step, the apparatus for measuring an object quantity extracts a second feature map by mutually complementing the extracted first feature map.

In the S207 step, the apparatus for measuring an object quantity combines the extracted second feature maps and passes the combined feature map to a fully connected layer to learn an object quantity model that infers the object quantity of the segmented object.

In the S208 step, the apparatus for measuring an object quantity measures an object quantity in a second object image, which is a measurement target, by using the learned object region model and object quantity model.

Figure 3:
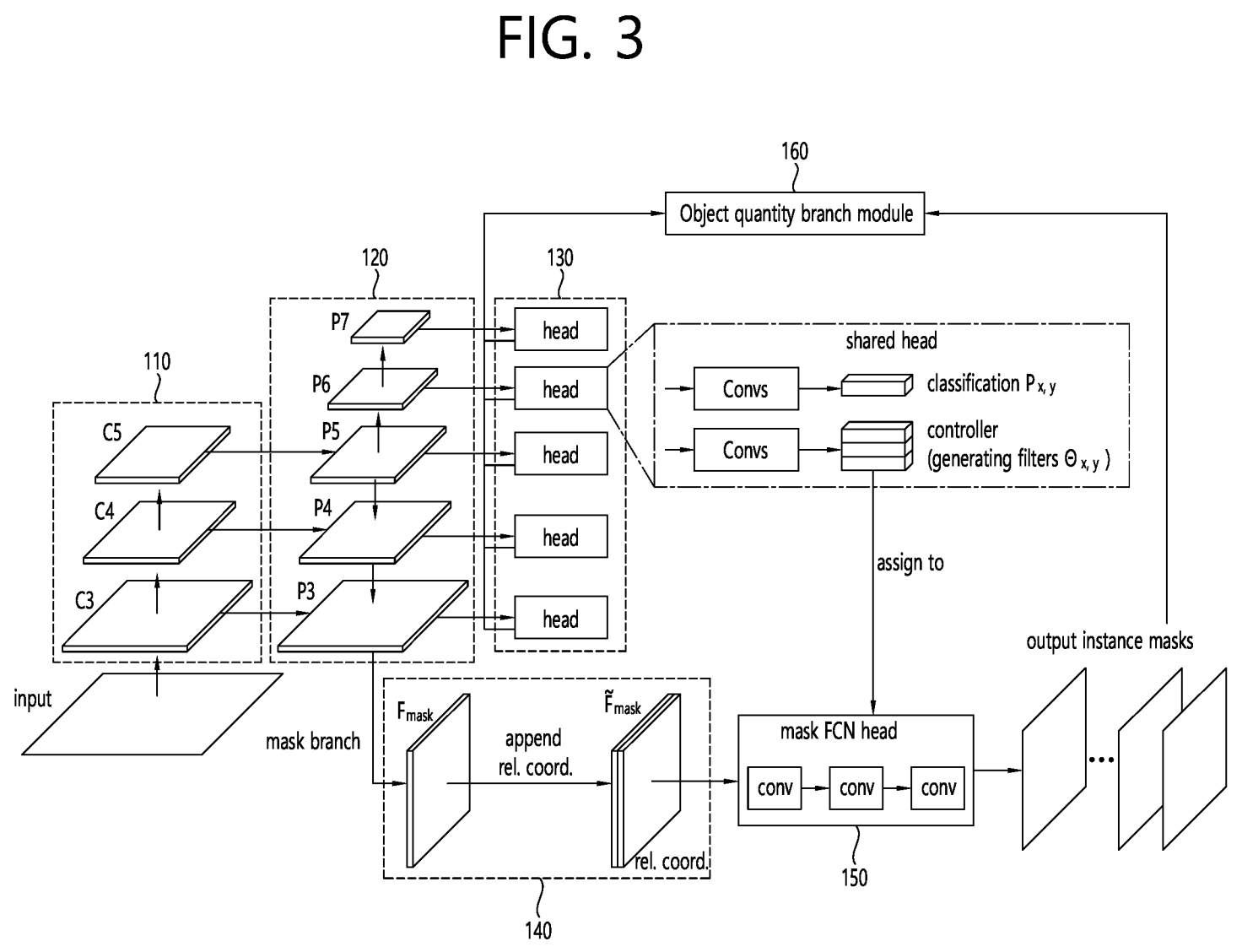

FIG. 3 illustrates an object quantity measurement model using a 2D image according to one embodiment of the present disclosure.

As shown in FIG. 3, an apparatus for measuring an object quantity using a 2D image according to one embodiment of the present disclosure performs an object region extraction operation through a mask branch and an object quantity measurement operation through an object quantity branch by using an object quantity measurement model. The object quantity measurement model includes a first feature map module 110 for segmentation through a mask branch, a second feature map module 120, a detection module 130, a coordinate module 140, an object region extraction module 150, and an object quantity branch module 160 for object quantity measurement. According to the embodiments, the first feature map module 110, the second feature map module 120, the detection module 130, the coordinate module 140, the object region extraction module 150, and the object quantity branch module 160 included in the object quantity measurement model may be implemented by a processor.

In what follows, specific operations of the object quantity measurement model using a 2D image according to one embodiment of the present disclosure will be described.

The overall structure of the object quantity measurement model is shown in FIG. 3. An object quantity measurement model using a 2D image according to one embodiment of the present disclosure includes an object quantity branch module 160 that calculates an object quantity in addition to the object region model structure through a mask branch.

First, the structure of the object region model will be described. The object region model extracts an object region through an object image. Since values of surrounding pixels are essential when obtaining an object quantity in an object image through the object region model, the object region model may accurately extract an object region using values of surrounding pixels rather than a simple segmentation model. Here, the object area may include a bounding box or segmentation, which is not limited to a specific region-based method for specifying an object.

The apparatus for measuring an object quantity performs an object region extraction operation by distinguishing an object from the rest of the background other than the object when the object region extraction model determines that an object to be identified exists in the object region of an object image. Here, it is assumed that the similarity between the object and the background other than the object is considerably low in color level. Based on the assumption, the apparatus for measuring an object quantity utilizes color similarity to learn segmentation using only object region labels. The part for outputting an instance mask through the mask branch in FIG. 3 corresponds to the part for obtaining the segmentation.

In what follows, the object region extraction operation through a mask branch will be described in detail.

First, the apparatus for measuring an object quantity receives an input image including an object.

The first feature map extraction module 110 receives the input image and extracts a first feature map for the input image through C3, C4, and C5.

The second feature map module 120 mutually complements the first feature maps extracted by the first feature map extraction module 110 and extracts a second feature map through P3 to P7, which contains more feature map information than the first feature map. Here, the second feature maps extracted from P3, P4, P5, P6, and P7, extracted by the second feature map module 120, pass through a detection module shared for all layers.

The detection module 130 determines the position and type of an object in the input image and extracts a controller for extracting an object region through a head. For example, the object type may be extracted as classification $P_{x, y}$, and the controller may be extracted as controller (generating filters $\theta_{x, y}$).

Here, boxes indicating the same object may be removed using a non-maximum suppression (NMS) method. The non-maximum suppression (NMS) method is an algorithm for assigning one bounding box to one object by using the Intersection over Union (IoU) metric that indicates the percent overlap between object regions predicted by non-maximum suppression and the probability that each bounding box predicted by the segmentation model contains an object.

The coordinate module 140 adds relative coordinate values to the second feature map that has passed through the mask branch separately from the detection branch.

Next, the segmentation module 150 performs segmentation by using the controller of each object region calculated through the detection module as a parameter.

On the other hand, the object to be classified may be given thousands or tens of thousands of names depending on the point of view from which the object is seen. Therefore, the apparatus for measuring an object quantity may perform binary segmentation in which all pixels in the object image are classified so that the part corresponding to the object is designated as 1 and the background as 0 in the object image.

Similarly, the apparatus for measuring an object quantity may calculate the object quantity of an object in the object image through the object quantity branch module 160. The apparatus for measuring an object quantity may accurately measure the object quantity using the calculated object quantity or object volume and the density value corresponding to the type of the corresponding object. Here, the object quantity branch module 160 uses the regression loss to learn the object quantity instead of performing segmentation of an object in the bounding box in the object image, as performed in the mask branch.

FIG. 4 illustrates an operation of learning an object quantity model using an object quantity branch module according to one embodiment of the present disclosure.

As shown in FIG. 4, an operation of learning the object quantity model using the object quantity branch module 160 will be described.

In the S301 step, the apparatus for measuring an object quantity extracts a first feature map for the C-level part in order of object size in the object image through the first feature map module 110. The first feature map for the C-level part may be extracted from a backbone based on a convolutional neural network (CNN). Here, the C-level part may have feature point information in the order of the food object size in the input object image. For example, the C3 level part may have feature point information for large objects, the C4 level part may have feature point information for medium-sized objects, and the C5 level part may have feature point information for small objects.

In the S302 step, the apparatus for measuring an object quantity extracts a second feature map for the P-level part through the second feature map module 120. Here, the second feature maps for the P-level part mutually complement the information of the first feature maps for the C-level part and provide more information. For example, the second feature maps for the P-level part may include object quantity information in addition to the class information and location information of objects in the object image. Since learning is performed using object quantity loss in the object quantity branch module 160, the second feature maps for the P-level part may include object class and location information and object quantity information.

In the S303 step, the apparatus for measuring an object quantity combines all of the second feature maps from the P-level part for flattening the feature maps, passes the combined map through a fully connected (FC) layer, and extracts the object quantity.

In the S304 step, the apparatus for measuring an object quantity checks whether a predetermined performance evaluation index (e.g., IoU performance evaluation index) is less than a threshold value.

In the S305 step, the apparatus for measuring an object quantity calculates a regression loss between an extracted object quantity and the actual object quantity and learns the object quantity model using the calculated regression loss if the predetermined performance evaluation index is greater than or equal to the threshold value.

On the contrary, in the S306 step, the apparatus for measuring an object quantity excludes the object quantity loss for the extracted object quantity from the entire object quantity loss if the predetermined performance evaluation index is less than the threshold value.

As described above, the object quantity for the extracted object does not directly regress to the actual object quantity. For example, only when a predetermined performance evaluation index (e.g., the IoU threshold) is 50 or more in the mask branch part, the object quantity loss is calculated together, and the optimizer performs the backpropagation operation. If the predetermined performance evaluation index (e.g., the IoU threshold) does not exceed 50, the object quantity loss is not included in the total loss.

Here, the reason why the object quantity loss is calculated together only when the predetermined performance evaluation index (e.g., the IoU threshold) is 50 or more is that, like other detection models, at the initial stage, an object's location may not be properly identified, and the background may be wrongly detected as an object. At this time, learning may not proceed properly when object quantities are calculated while there is no actual object.

Therefore, the apparatus for measuring an object quantity according to one embodiment of the present disclosure may determine the location of an object directly from an object image composed of RGB data without employing a mathematical algorithm and, at the same time, measure the object quantity of the object accurately even from the 2D object image using the object quantity model learned to estimate the object quantity.

FIG. 5 illustrates a structure of an apparatus for measuring an object quantity using a 2D image according to one embodiment of the present disclosure.

As shown in FIG. 5, the apparatus 200 for measuring an object quantity according to one embodiment of the present disclosure includes a database 210, a memory 220, and a processor 230. However, not all of the constituting elements shown in the figure are essential constituting elements. The apparatus 200 for measuring an object quantity according to one embodiment of the present disclosure may be implemented using a larger or smaller number of constituting elements than shown in the figure.

In what follows, a detailed structure and operation of each constituting element of the apparatus 200 for measuring an object quantity using a 2D image according to one embodiment of the present disclosure of FIG. 5 will be described.

The database 210 stores a plurality of first object images which are pre-learning targets.

The memory 220 stores one or more programs related to measuring an object quantity using a 2D image.

The processor 230 executes one or more programs stored in the memory 220. The processor 230 learns an object quantity model using a first object image which is a pre-learning target through classification of an object and a background, learns an object quantity model for a first object region in the first object image using a feature map extracted from the first object image, and measures an object quantity for a second object region in a second object image, which is a measurement target, by using the learned object region model and object quantity model.

According to embodiments, the processor 230 may receive a first object image including an object for which a pre-learning target region is labeled and learn an object region model by segmenting an object of a first object region through classification of an object and a background in the first object region of the first object image received.

According to embodiments, the processor 230 may classify an object and a background using color similarity in a first object region of the first object image.

According to embodiments, the processor 230 may learn an object quantity model for the first object region by extracting a first feature map for the first object image through an object quantity branch connected to the object region model, extracting a second feature map by mutually complementing the extracted first feature map, combining the extracted second feature maps, and passing the combined feature map to a fully connected layer.

According to embodiments, the processor 230 may learn an object quantity model for the first object region by calculating a regression loss between an object quantity inferred through an object quantity branch connected to the object region model and a predetermined, actual object quantity.

According to embodiments, the processor 230 may exclude the regression loss between the inferred object quantity and the predetermined, actual object quantity from the operation of learning an object quantity model when a predetermined performance evaluation index is less than a threshold value.

According to embodiments, the processor 230 may extract a second object included in the second object image and a reference object, estimate a distance between the extracted second object and the reference object through a depth estimation model, correct the size of the second object in the second object image using the estimated distance between the second object and the reference object, and measure an object quantity using the corrected size of the second object.

The processor may extract reference objects one after another starting from a reference object with the highest priority in the second object image according to a predetermined priority condition.

On the other hand, examining the selection order of reference objects, an object with a fixed size receives a high priority for selecting a reference object; as the size variation becomes high, the corresponding object is given a lower priority in extracting a reference object.

For example, a reference object with the highest priority is a product sold with fixed specifications, which may include a prototype sauce and beverage (e.g., products with a fixed size, such as Coca-Cola can, Ottogi pepper).

Next, the reference object with the second highest priority may be tableware frequently found in an object image, which includes spoons, chopsticks, forks, and knives, most of which have a similar range in size, rather than the tableware having a particular shape.

Meanwhile, when the processor executes a method, a non-transitory computer-readable storage medium may be provided for storing instructions used by the processor to execute the method, the method comprising learning an object region model using a first object image which is a pre-learning target through classification of an object and a background; learning an object quantity model for a first object region in the first object image using a feature map extracted from the first object image; and measuring an object quantity of a second object region in a second object image which is a measurement target using the learned object region model and object quantity model.

Meanwhile, according to one embodiment of the present disclosure, various embodiments described above may be implemented by software including instructions stored in a machine (e.g., a computer) readable storage media. The machine is an apparatus capable of calling stored instructions from the storage medium and operating according to the instructions called, which may include an electronic device (for example, an electronic device (A)) according to the disclosed embodiments. When an instruction is executed by the processor, the processor may perform the function corresponding to the instruction directly or by using other constituting elements under the control of the processor. The instruction may include code generated or executed by a compiler or an interpreter. The machine-readable storage medium may be provided in the form of a non-transitory storage medium. Here, the term 'non-transitory' only indicates that the storage medium does not include a signal and is tangible but does not distinguish whether data are stored semi-permanently or temporarily.

Also, according to one embodiment of the present disclosure, the method according to various embodiments described above may be provided by being included in a computer program product. The computer program product may be traded between sellers and buyers as a commodity. The computer program product may be distributed in the form of a machine-readable storage medium (for example, a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, the computer instructions for executing processing operations of the machine according to various embodiments described above may be stored in a non-transitory computer-readable medium. When executed by a processor of a specific machine, the computer instructions stored in the non-transitory computer-readable medium instruction the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Also, each of the constituting elements (for example, a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

What is claimed is:

1. A method for accurately measuring an object quantity using a 2D image executed by an apparatus for measuring the object quantity, the method comprising:

learning an object region model in a first object image which is 2D image and a pre-learning target;

learning an object quantity model for a first object region in the first object image using a feature map extracted from the first object image; and measuring an object quantity of at least one of a second object region and a background region in a second object image which is 2D image and a measurement target using the learned object region model and object quantity model, wherein the learning an object quantity model learns an object quantity model for the first object region by extracting a first feature map for a C-level part in order of object size in the first object image through an object quantity branch connected to the object region model, extracting a second feature map for a P-level part by mutually complementing the extracted first feature map for the C-level part, combining the extracted second feature maps, and passing the combined feature map to a fully connected layer, wherein the C-level part has feature point information in the order of the object size in the first object image, wherein the second feature map for the P-level part includes object quantity information, wherein the learning an object region model learns the object region model by segmenting an object of the first object region through classification of an object and a background in the first object region of the first object image.

2. The method of claim 1, wherein the learning an object region model classifies an object and a background using color similarity in a first object region of the first object image.

3. The method of claim 1, wherein the learning an object quantity model learns an object quantity model for the first object region by calculating a regression loss between an object quantity inferred through the object quantity branch connected to the object region model and a predetermined, actual object quantity.

4. The method of claim 3, wherein the learning an object quantity model excludes the regression loss between the inferred object quantity and the predetermined, actual object quantity from the operation of learning an object quantity model when a predetermined performance evaluation index is less than a threshold value.

5. The method of claim 1, further including:

extracting a second object included in the second object image and a reference object;

estimating a distance between the extracted second object and the reference object through a depth estimation model;

correcting the size of the second object in the second object image using the estimated distance between the second object and the reference object; and measuring an object quantity using the corrected size of the second object.

6. The method of claim 5, wherein the extracting a reference object extracts reference objects one after another starting from a reference object with the highest priority in the second object image according to a predetermined priority condition.

7. An apparatus for measuring an object quantity using a 2D image, the apparatus comprising:

a database storing a first object image which is a pre-learning target;

a memory storing one or more programs; and a processor executing the stored one or more programs, wherein the processor is configured to:

learn an object region model in a first object image which is a pre-learning target;

learn an object quantity model for a first object region in the first object image using a feature map extracted from the first object image; and measure an object quantity of at least one of a second object region and a background region in a second object image which is a measurement target using the learned object region model and object quantity model, wherein the processor learns an object quantity model for the first object region by extracting a first feature map for a C-level part in order of object size in the first object image through an object quantity branch connected to the object region model, extracting a second feature map for a P-level part by mutually complementing the extracted first feature map for the C-level part, combining the extracted second feature maps, and passing the combined feature map to a fully connected layer, wherein the C-level part has feature point information in the order of the object size in the first object image, wherein the second feature map for the P-level part includes object quantity information, wherein the learning an object region model learns the object region model by segmenting an object of the first object region through classification of an object and a background in the first object region of the first object image.

8. The apparatus of claim 7, wherein the processor classifies an object and a background using color similarity in a first object region of the first object image.

9. The apparatus of claim 7, wherein the processor learns an object quantity model for the first object region by calculating a regression loss between an object quantity inferred through an object quantity branch connected to the object region model and a predetermined, actual object quantity.

10. The apparatus of claim 9, wherein the processor excludes the regression loss between the inferred object quantity and the predetermined, actual object quantity from the operation of learning an object quantity model when a predetermined performance evaluation index is less than a threshold value.

11. The apparatus of claim 7, wherein the processor extracts a second object included in the second object image and a reference object, estimates a distance between the extracted second object and the reference object through a depth estimation model, corrects the size of the second object in the second object image using the estimated distance between the second object and the reference object, and measures an object quantity using the corrected size of the second object.

12. The apparatus of claim 11, wherein the processor extracts reference objects one after another starting from a reference object with the highest priority in the second object image according to a predetermined priority condition.

\* \* \* \* \*